US012615072B2

(12) United States Patent (10) Patent No.: US 12,615,072 B2
Baba et al. (45) Date of Patent: Apr. 28, 2026

(54) SETTLEMENT SYSTEM

(71) Applicant: DENSO WAVE INCORPORATED,
Aichi-pref. (JP)

(72) Inventors: Chiaki Baba, Chita-gun (JP); **Fuminori
Ito, Chita-gun (JP); Mieko Fukatsu,**
Chita-gun (JP)

(73) Assignee: DENSO WAVE INCORPORATED,
Aichi-pref. (JP)

( * ) Notice: Subject to any disclaimer, the term of this
patent is extended or adjusted under 35
U.S.C. 154(b) by 530 days.

(21) Appl. No.: 18/026,656

(22) PCT Filed: Sep. 24, 2021

(86) PCT No.: PCT/JP2021/035184
§ 371 (c)(1),
(2) Date: Mar. 16, 2023

(87) PCT Pub. No.: WO2022/065453
PCT Pub. Date: Mar. 31, 2022

(65) Prior Publication Data
US 2023/0334487 A1 Oct. 19, 2023

(30) Foreign Application Priority Data

Sep. 24, 2020 (JP) ................................. 2020-159993

(51) Int. Cl.
*H04B 5/00* (2024.01)
*G06Q 20/40* (2012.01)
(52) U.S. Cl.
CPC .............. *H04B 5/00* (2013.01); *G06Q 20/40*
(2013.01)
(58) Field of Classification Search
CPC .................................. H04B 5/00; G06Q 20/40
See application file for complete search history.

(56) References Cited

U.S. PATENT DOCUMENTS

| 2008/0149584 A1* | 6/2008 | Martinelli | .............. G06Q 10/08 |
| | | | 215/202 |
| 2009/0195510 A1* | 8/2009 | Saunders | ............ G06F 3/04886 |
| | | | 345/169 |

(Continued)

FOREIGN PATENT DOCUMENTS

| JP | 2009258822 A | * 11/2009 |
| JP | 2019-028596 A | 2/2019 |

(Continued)

*Primary Examiner* — Daniel Samwel
(74) *Attorney, Agent, or Firm* — OLIFF PLC

(57) ABSTRACT

A settlement system includes code display section and
mobile terminal. A first information and remittance destina-
tion information are displayed as specific information code
on code display section. Code display section has memory
for storing second information for authenticating first infor-
mation, and antenna coil for receiving radio waves, gener-
ating electromotive force, supplying electromotive force to
memory, and transmitting second information recorded
memory. Mobile terminal has imaging unit for imaging
information code, transceiver for transmitting and receiving
response to radio waves, imaging control unit for imaging
information code, transmitter control unit for transmitting
radio waves to transceiver, and processing control unit
performs settlement processing using remittance destination
information read from specific information code when
authentication using first information read from specific
information code and second information received by trans-
ceiver as response to radio wave is successful. Processing
control unit receives second information from antenna coil,
but prohibits settlement process when authentication fails.

15 Claims, 13 Drawing Sheets

(56)                      References Cited

U.S. PATENT DOCUMENTS

| | | | |
|---|---|---|---|
| 2010/0231387 A1* | 9/2010 | Hong ................. | G06K 7/10346 |
| | | | 340/541 |
| 2011/0109169 A1* | 5/2011 | Shimamoto .......... | G06K 7/0008 |
| | | | 307/104 |
| 2012/0145794 A1* | 6/2012 | Mieslinger .............. | H01P 11/00 |
| | | | 156/60 |
| 2013/0332358 A1* | 12/2013 | Zhao .................... | G06Q 20/425 |
| | | | 705/44 |
| 2014/0067674 A1* | 3/2014 | Leyva .................... | G06Q 20/20 |
| | | | 705/44 |
| 2014/0081784 A1 | 3/2014 | Ahn | |
| 2018/0225650 A1* | 8/2018 | Vossoughi ............. | G06Q 30/02 |
| 2019/0325286 A1 | 10/2019 | Prakash et al. | |
| 2020/0097946 A1 | 3/2020 | Bian et al. | |
| 2020/0160004 A1* | 5/2020 | Yamamoto ......... | G06K 7/10366 |
| 2021/0004463 A1* | 1/2021 | Todasco ................ | G06F 21/565 |
| 2021/0027273 A1* | 1/2021 | Bhuptani ........... | G06Q 20/0457 |

FOREIGN PATENT DOCUMENTS

| | | | |
|---|---|---|---|
| JP | 2020-52825 A | 4/2020 | |
| JP | 2020-061039 A | 4/2020 | |
| KR | 102088623 B1 | 3/2020 | |

* cited by examiner (1st EXAMPLE)

(2nd EXAMPLE)

HANDLING MOBILE TERMINAL
APP START

S110
START INSTRUCTION ?          NO

YES

S112
ACTIVATES CAMERA

S120
READ INFORMATION CODE ?          NO

YES

S122
NO          NFC READING REQUIRED ?

YES

S124
TRANSMIT RADIO WAVE

S130
RECEIVE NFC INFORMATION ?          NO

YES

S140
INFORMATION MATCH
NFC INFORMATION ?          NO

YES

S150
SETTLEMENT PROCESS

S152
ERROR PROCESS

RETURN (3nd EXAMPLE)

(4st EXAMPLE)　　　FIG.6

FIG.10

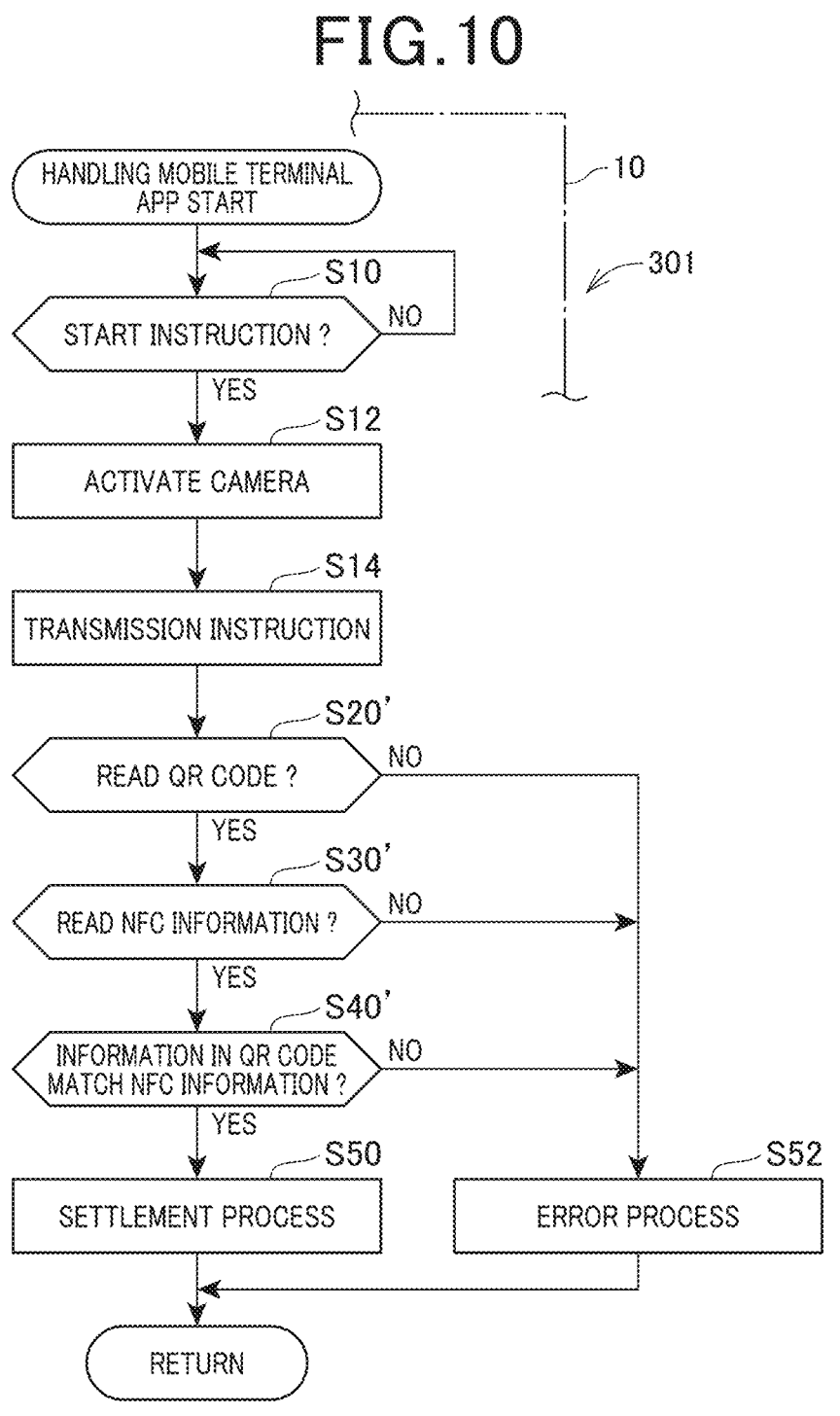

```
                              ┌──────────────────────────────┐
                              │           10                 │
   ┌──────────────────────┐   │                              │
   │ HANDLING MOBILE       │   │        301                   │
   │ TERMINAL APP START    │   │                              │
   └──────────────────────┘   │                              │
              │               │                              │
              ▼     S10        │                              │
         ◇ START INSTRUCTION ? ◇──NO──┐                       │
              │YES                                            │
              ▼     S12                                       │
   ┌──────────────────────┐                                  │
   │   ACTIVATE CAMERA     │                                  │
   └──────────────────────┘                                  │
              │     S14                                       │
              ▼                                               │
   ┌──────────────────────┐                                  │
   │ TRANSMISSION          │                                  │
   │ INSTRUCTION           │                                  │
   └──────────────────────┘                                  │
              │     S20'                                      │
              ▼                                               │
         ◇ READ QR CODE ? ◇──NO───────────────┐              │
              │YES                             │              │
              ▼     S30'                       │              │
     ◇ READ NFC INFORMATION ? ◇──NO───────────┤              │
              │YES                             │              │
              ▼     S40'                       │              │
  ◇ INFORMATION IN QR CODE ◇──NO──────────────┤              │
    MATCH NFC INFORMATION ?                    │              │
              │YES                             │              │
              ▼     S50                        ▼    S52       │
   ┌──────────────────────┐         ┌──────────────────┐     │
   │ SETTLEMENT PROCESS    │         │  ERROR PROCESS   │     │
   └──────────────────────┘         └──────────────────┘     │
              │                             │                 │
              ▼◄────────────────────────────┘                 │
        ┌──────────┐                                          │
        │  RETURN  │                                          │
        └──────────┘                                          │
```

SETTLEMENT SYSTEM

TECHNICAL FIELD

A technology disclosed herein pertains to settlement systems pertaining to buy and sell transactions, particularly relating to a settlement system for executing settlement using an information code displayed on a display surface of a code display section.

BACKGROUND TECHNOLOGY

Patent Document 1 discloses settlement in the form of MPM (short for Merchant Presented Mode) as settlement of trade transactions using information codes (e.g., two-dimensional bar codes). In the MPM system, for example, the information code in which the identification code associated with the store is recorded is presented to the customer by means of a paper medium. When the customer's terminal reads the information code, the purchase price is paid to the store. In other words, the purchase price is settled.

PRIOR ART LITERATURE

Patent Literature

Patent Document 1: Japanese Patent Laid-Open No. 2020-052825

OVERVIEW OF THE INVENTION

The Subject of the Invention

The information codes are normally printable. For example, if a malicious third party fraudulently replaces a paper medium printed with a legitimate information code with a paper medium printed with a different information code, it may lead to fraudulent activities, such as the failure to pay the store and the fraudulent payment of the price to the third party.

In this specification, the information codes such as the QR codes (registered trademarks) and communication technologies are used to provide technology which prevents an unauthorized settlement of the purchase price in a combined settlement system pertaining to buying and selling transactions.

SUMMARY OF THE INVENTION

The settlement system for buying and selling transactions disclosed herein consists of a code display section, and a mobile terminal. A first information and a remittance destination information indicating a destination of money to be purchased in a purchase transaction are displayed as a specific information code on a display surface of the code display section. The code display section has a memory for storing a second information for authenticating a first information, and an antenna coil capable of receiving radio waves from the outside, generating electromotive force, supplying the electromotive force to the memory, and transmitting the second information recorded in the memory.

The mobile terminal has an imaging unit capable of imaging the information code, a transceiver capable of transmitting the radio waves and receiving a response to the radio waves, an imaging control unit that causes the imaging unit to image the information code, a transmitter control unit for transmitting the radio waves to the transceiver, and a processing control unit performs settlement processing using the remittance destination information read from the specific information code when authentication using the first information read from the specific information code and the second information received by the transceiver as the response to the radio wave is successful. The processing control unit receives the second information as the response to the radio wave from the antenna coil, but prohibits the settlement process when the authentication fails due to the imaging unit images an information code different from the specific information code.

According to such a configuration, for example, even if the specific situation of the code display section is replaced with a different information code by a third party, the above authentication fails and settlement processing is not performed. It can prevent the purchase price from being illegally settled.

The specific information code records the prescribed instruction information. The imaging control unit causes the imaging unit to image the information code before the transceiver transmits the radio wave. The transmission control unit causes the transceiver to transmit the radio wave when the instruction information is read from the imaged information code. The processing control unit executes the settlement processing without causing the transceiver to transmit the radio waves when the instruction information is not read from the information code imaged by the imaging unit.

For example, a situation is assumed in which the above specific code display section and other code display section without memory and antenna coil ("Other code display area" is described below.) are mixed. According to the above configuration, before the transceiver transmits radio waves, the mobile terminal images the information code to determine whether or not the information code records the prescribed instruction information. In the case if the information code does not record the prescribed instruction information, such case means that the information code is an information code of another code display area. In this case, the mobile terminal uses the information code in the other code display area to perform the settlement processing. Accordingly, in a situation where a specific code display section and another code display area are mixed, the settlement processing using the other code display area could be properly executed.

The memory further memorizes a settlement information to which a specific payment is settled. The transceiver receives the settlement information from the antenna coil, and the processing control unit executes the settlement processing by designating the specific payment indicated by the settlement information.

There have been several payment services in recent years. For example, a comparison example in which a user designates a specific payment destination from multiple payment destinations is assumed. In this comparative example, the user may find the operation of specifying a particular payment destination annoying. In contrast, according to the above configuration, settlement destination information indicating a specific settlement destination is stored in the memory of the code display section, and the mobile terminal can designate the specific settlement destination using the settlement destination information. Users do not have to specify a specific payment destination. Therefore, the user's convenience is enhanced.

The mobile terminal is further provided with a display and a display control unit that causes an inquiry screen to be displayed on the display when the transceiver does not receive the second information from the antenna coil in spite of transmitting the radio wave. The processing control unit executes the settlement processing when the first instruction is given in the query screen, but does not execute the settlement processing when the second instruction different from the first instruction is given in the query screen.

With such a configuration, in the case if the second information is not received from the antenna coil because of any cause (e.g., broken antenna coils), the settlement process is executed by the first instruction in the query screen. Even if the second information in the memory is not available, the user can still use the payment using a specific information code. Accordingly, the user's convenience is enhanced.

The code display section is composed of a display part equipped with the display surface and an installation part for mounting the display part on a stand. The antenna coil is located at least in the installation part. The processing control unit does not execute the settlement processing when the second information is not received from the antenna coil though the transceiver transmitted the radio waves.

For example, a situation can be assumed in which the third party attempts to remove a specific code display section from the stand for information code switching. In this case, the installation part may be damaged and the antenna coil located in the installation part may also be damaged. If the antenna coil is damaged, the second information cannot be received from the antenna coil and, therefore, the settlement processing is not performed. The settlement processing can be prevented from being performed in cases where it is presumed that fraudulent activity has been committed.

The code display section is composed of a display part equipped with the display surface and an installation part for mounting the display part on a stand. The antenna coil is located at least one of the display parts and the installation parts. The display parts and the installation parts are physically joined and separated from each other. The processing control unit may execute the settlement process when the transceiver transmits the radio waves though the second information is not received from the antenna coil.

Such a configuration includes the display parts can be moved arbitrarily from the stand. The user's convenience could be improved.

The antenna coil is applied to both the display part and the installation part.

The function of the antenna coil is invalidated by isolating the display part.

The memory may be located in the installation part.

In the case if the particular code display section is removed from the stand, the installation part remains on the stand and the display parts are likely to be removed. In the comparative example where the memory is placed in the display part, by the third party acquiring the display part, the memory in the display part can be acquired by the third party and the information in the memory can be stolen by the third party. By contrast, with the above configuration, the memory is likely to be left on the stand along with the installation parts. The information in the memory is less likely to be stolen by the third party. The information in the memory could be prevented from being stolen by the third parties.

In addition, the code display section is composed of a display part equipped with the display surface and an installation part for mounting the display part on a stand. The display parts and the installation parts are physically joined and separated from each other. The antenna coil is applied to a part of the display part and a part of the installation part in such a way that it goes through the part of the display part and the part of the installation part. A loop of the antenna coil is completed when the display parts and the installation parts are physically joined, but the loop of the antenna coil is positioned so as to be disconnected when the display part is separated from the installation part. The processing control unit is configured so as not to execute the settlement process when the transceiver does not receive the second information from the antenna coil despite transmitting the radio waves.

Thus, when the installation part, i.e., the code display section, is forcibly moved, for example, illegally, the loop of the antenna coil is actively broken or its antenna function is lost. In this way, fraudulent activities such as stealing or replacing information codes can be suppressed or prevented.

In yet another aspect, a settlement system for buying and selling transactions, equipped with a mobile terminal, a display terminal and a terminal stand. A display surface of the display terminal is configured to be capable of displaying a QR code (registered trademark) for recording at least a destination information indicating a destination of remittance of a purchase price to be purchased in relevant buying and selling transaction and a location of installation. The terminal stand has a configuration that at least memorizes the location of installation and enables NFC communication. The display terminal is provided with a means for determining whether or not the installation locations of the QR code coincide with the installation locations of the terminal stand via the NFC communication and a means for displaying the QR code on the display surface when the installation locations coincide. The mobile terminal is configured to obtain a settlement information associated with the buying and selling transaction by imaging the QR code displayed on the display surface of the display terminal.

With this, the QR code is displayed on the display terminal only when the installation location is verified by the display terminal and the terminal stand, allowing payments to be made via the mobile terminal. On the other hand, when such authentication is not established, the QR code is not displayed, so this aspect can also suppress unauthorized access to the QR code. Furthermore, by having multiple installation locations (unique information) in the display terminal, authentication by selecting the installation location of the display terminal becomes possible, which increases the versatility of the display terminal.

It should be noted that the further characteristic structure of the present disclosure and its working effect are described in detail with the accompanying drawings and various examples of the embodiment described below.

CONCISE EXPLANATION OF DRAWINGS

In the accompanying drawings:

FIG. 10 shows a flowchart of the processing executed by the mobile terminal according to Example 7.

EXAMPLES FOR CARRYING OUT INVENTION

Figure 1:
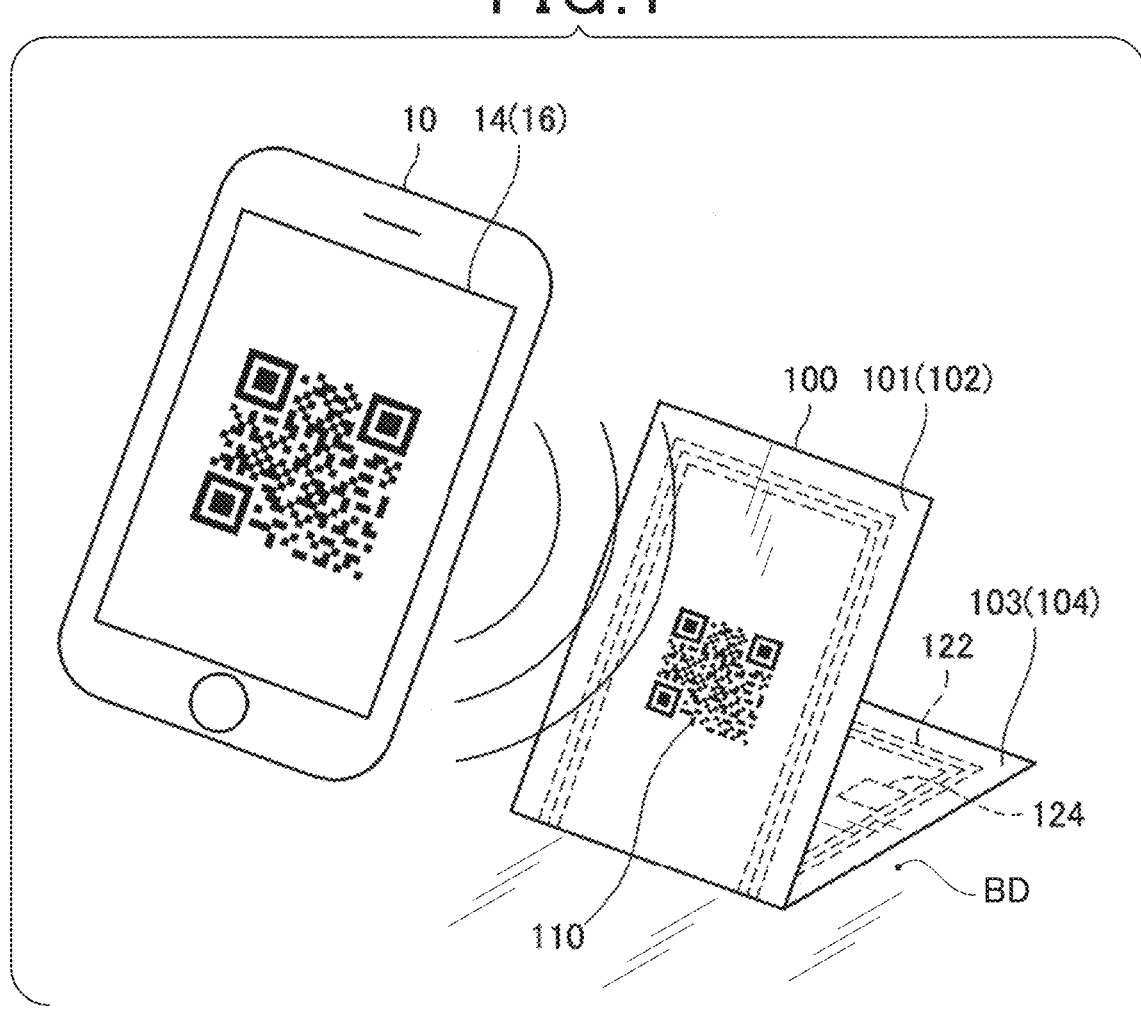
FIG. 1 shows an overview of the mobile terminal and the code display unit installed in the settlement system according to the first example.
Figure 2:
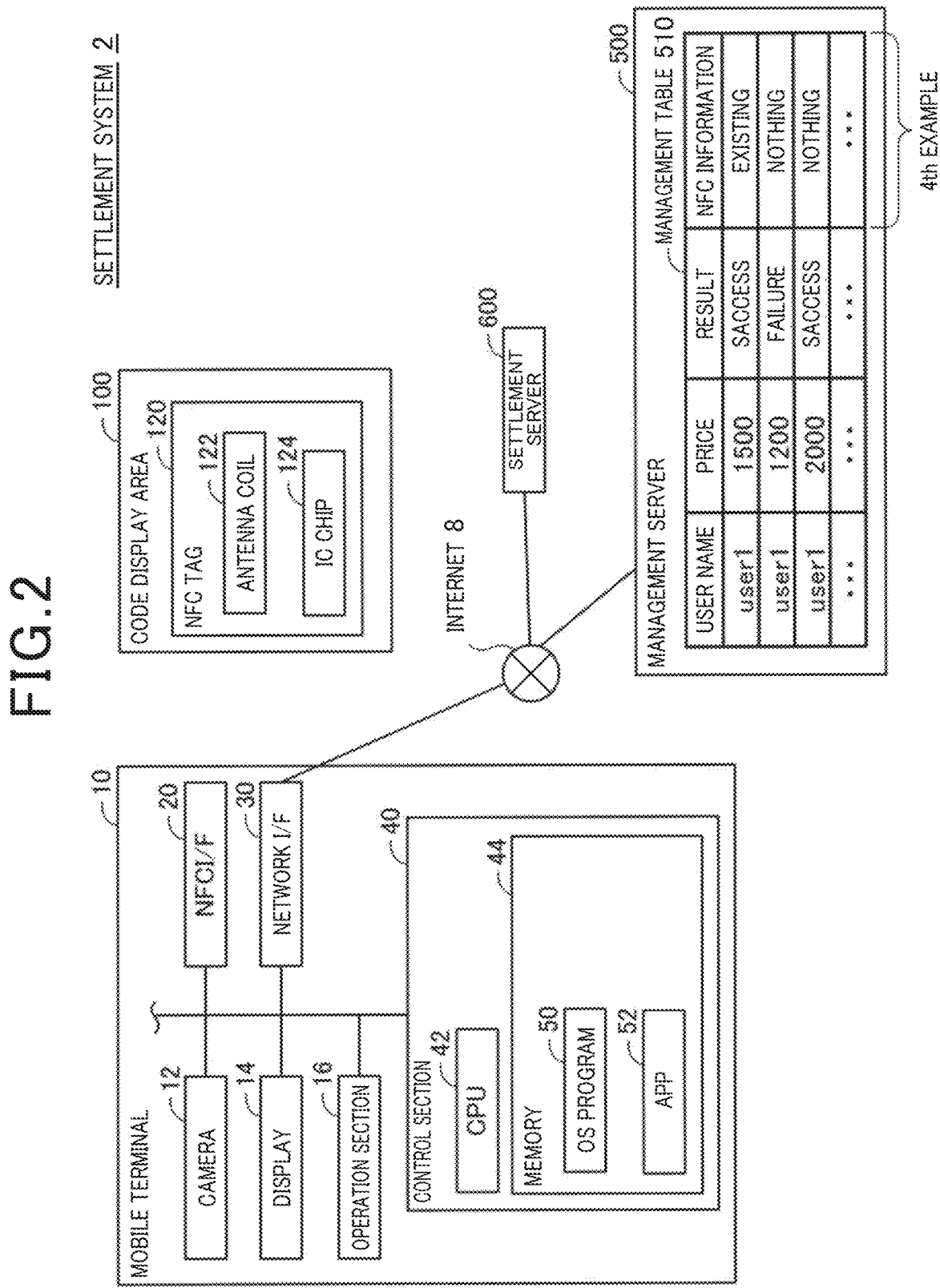
FIG. 2 shows a block diagram of the entire settlement system according to Example 1.

First Example (Configuration of Settlement System 2; FIG. 1, FIG. 2)

With reference to the drawings, a settlement system 2 for buying and selling transactions related to the first example is explained. The settlement system 2 is equipped with a mobile terminal 10, a code display section 100, a management server 500, and a settlement server 600. The settlement server 600 is a server that provides a service for contracting settlement of the purchase price. The settlement server 600 is installed on the internet 8 by the business operator providing the service.

The mobile terminal 10 is a terminal such as a smartphone or tablet PC. The code display section 100 is a medium for displaying an information code for executing settlement according to the MPM (short for Merchant Presented Mode) method. The code display section 100 is created, for example, by paper media and installed in the store.

In the MPM system, the user operates the mobile terminal 10 to display the code display section 10. The mobile terminal 10 reads the destination information recorded in the information code 110 from the imaged information code 110. The remittance destination information is an information indicating the destination of the payment to be purchased, such as an ID for identifying the store, the number of the bank account held by the store, etc. The mobile terminal 10 transmits the read destination information and the price to the settlement server 600. The settlement server 600 transfers the money to the destination indicated by the destination information. This completes the settlement of the payment.

(Configuration of the Mobile Terminal 10)

The mobile terminal 10 is equipped with a camera 12, a display 14, an operation section 16, an NFC (short for Near Field Communication) interface 20, and a network interface 30. The interface is referred as 'I/F' hereinafter.

The camera 12 is placed on the back of the mobile terminal 10. The display 14 and the operation section 16 are arranged in front of the mobile terminal 10. In a variation, the camera 12 may be placed in front of the mobile terminal 10.

Display 14 is a display device for displaying various information. The operation section 16 is a device for receiving various instructions from the user. The display 14 is a touch panel and also functions as an operation section 16. In the modified example, the display 14 need not function as the operating section 16.

NFC I/F 20 is an I/F for reading an information recorded in an NFC tag (e.g., 120). The NFC I/F 20 can transmit radio waves to the NFC tag and receive a response to the radio waves from the NFC tag. In other words, NFC I/F 20 can perform communication according to NFC method with NC tag. The communicable distance between the NFC I/F 20 and the NC tag is, for example, within 10 cm.

An network I/F 30 is the I/F to perform communication with a server (e.g. 600) on the internet 8. The network I/F 30 is connected to the internet 8.

The control unit 40 is a device that controls each section 12-30. The control unit 40 is equipped with a CPU 42 and a memory 44. The CPU 42 executes various processes according to the programs 50, 52 stored in the memory 44. The memory 44 is composed of a volatile memory, a nonvolatile memory, etc. The OS program 50 is a program for controlling the basic operation of the mobile terminal 10. The application program 52 (hereinafter referred to as "app 52") is a program for executing communication with the settlement server 600 and the management server 500 described later. The app 52 is installed on a mobile terminal 10 from an app server (not shown) on the internet 8. The app 52 is uploaded to the app server, for example, by the operator of the management server 500.

(Configuration of Code Display Section 100)

As shown in FIG. 1, the code display section 100 includes a display part 101 and an installation part 103. The display part 101 has a display surface 102 for displaying the information code 110. The installation part 103 has an installation surface 104 for installing the code display section 100 on a stand BD used in a store, for example, for sales. The display part 101 is bent from the installation part 103 and stands up so that the information code 110 is visible to the user. For example, by bonding the installation surface 104 to the base BD, the code display section 100 is fixed on the base BD.

The conventional code display section is a medium that only displays information code 110. The code display section 100 disclosed herein further includes an NFC tag 120. The NFC tag 120 includes an antenna coil 122 and an IC chip 124.

The IC chip 124 stores NFC information. The IC Chip 124 is a memory. The NFC information includes a predetermined authentication string.

The antenna coil 122 receives radio waves from the NFC I/F (e.g. 20) and generates electromotive force, which is supplied to the IC chip 124. The antenna coil 122 also acquires NFC information from the IC chip 124 operated by the electromotive force and transmits NFC information to the NFC I/F in response to radio waves from the NFC I/F.

As shown in FIG. 1, the antenna coil 122 spans both the display part 101 and the installation part 103. In the modified example, the antenna coils 122 may be arranged only in either the display part 101 or the installation part 103.

Also, the IC chip 124 is located in installation part 103. For example, there could be a comparison example in which the IC chip 124 is placed in display part 101. In this comparative example, by a malicious third party pulling the display part 101 away from the installation part 103 and obtaining only the display part 101, the IC chip 124 could be obtained by the third party and the NFC information in the IC chip 124 could be stolen by the third party. In contrast, according to the configuration of this example, the IC chip 124 is likely to be left on the table BD together with the installation parts 103. The NFC information in the IC chip 124 is less likely to be stolen by the third party. Accordingly, the NFC information in the IC chip 124 could be prevented from being stolen by the third party. As a variation, the configuration of the above comparative example may be adopted.

The information code 110 of the code display section 100 disclosed herein records prescribed authentication information in addition to the remittance destination information described above. The predetermined authentication information contains the same string as the predetermined authentication string stored in the IC chip 124.

(Configuration of Management Server 500)

As shown in FIG. 2, the management server 500 records the management table 510 The management table 510 stores information about the payment using the app 52 for each of the multiple users. The management table 510 shows the user's name for identifying the user, the price paid by the user and the price result information that indicates the result of the settlement, and is stored in association with. The result information indicates one of two values: "success" indicating that the payment was successfully settled, or "failure" indicating that the payment was not settled.

Figure 3:
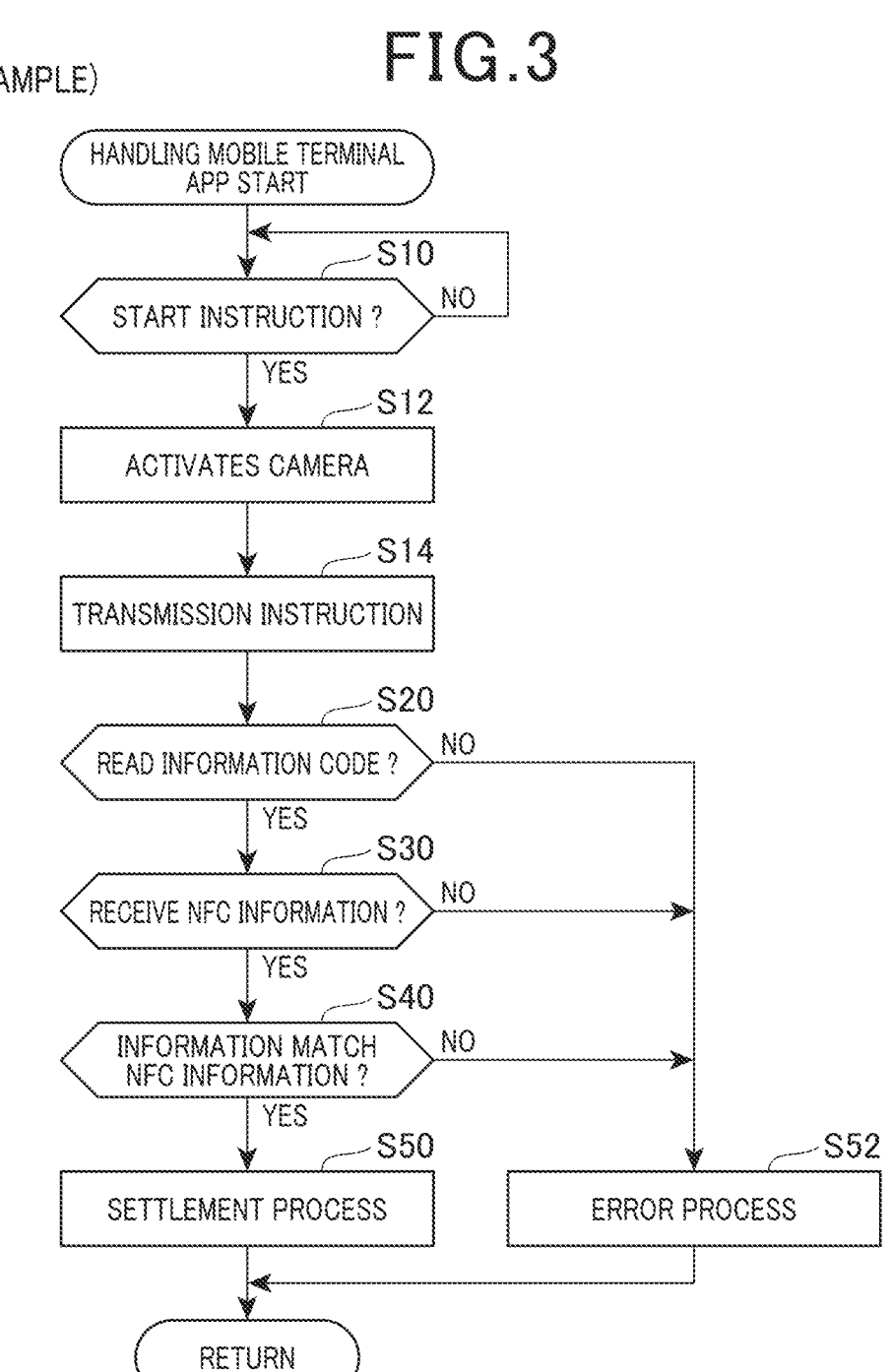
FIG. 3 shows a flowchart of the processing performed by the mobile terminal according to the first example.

(Handling Mobile Terminal 10; FIG. 3)

The processing executed by the CPU 42 of the mobile terminal 10 according to the app 52 will be described with reference to FIG. 3. The processing in FIG. 3 is executed as a trigger when the app 52 is started.

In S10, the CPU 42 monitors that the operation section 16 receives a start instruction from the user. The start instruction is an instruction to start MPM method settlement using the code display section 100. When the operation section 16 receives a start instruction (YES in S10), the CPU 42 activates the camera 12 in S 12. In the modified example, the processing of S 12 and S 14, which will be described later, may be executed with the activation of the app 52 as a trigger. In another variant, the start of the app 52 may be used as a trigger to execute the processing of S 12, and the processing of S 14 may be executed when the information code is successfully read (referring S 20 described below). In other variants, the activation of the app 52 may trigger the processing of S 14, and when NFC information is received (referring S 30, described later), the processing of S 12 may be executed. That is, in these variations, the start instruction of s10 can be omitted.

In subsequent S 14, the CPU 42 supplies radio transmission instructions to the NFC I/F 20. With this, the NFC I/F 20 starts transmitting radio waves.

In subsequent S 20, the CPU 42 determines whether the reading of the information code was successful. When the CPU 42 determines that the reading of the information code has failed due to the fact that the image captured by the camera 12 does not contain any information code, that the image contains an unclear information code, etc. (N0 in S 20), the process proceeds to S 52.

In S 52, the CPU 42 performs error handling. Specifically, the CPU 42 causes the display 14 to display an error screen indicating that the settlement has failed. In addition, the CPU 42 provides the user's name identifying the user of the mobile terminal 10 and the purchase price to be purchased and an error notification indicating that the payment has failed, are sent to the management server 500. As a result, the result information indicating that the payment failed for the user of the mobile terminal 10 is stored in the management table 510. When S 52 is over, the flowchart returns to monitoring S10.

When the image captured by the camera 12 contains some information code and the CPU 42 determines that the reading of the information code was successful (YES in S 20), the CPU 42 proceeds to S 30.

In S 30, the CPU 42 determines whether the NFC information in the IC chip 124 has been received as a response to the radio wave transmitted by the NFC I/F 20 in S 14. If the CPU 42 determines that NFC information has been received from the IC chip 124 via the NFC I/F 20 (YES in S 30), proceed to S 40.

In S 40, the CPU 42 determines whether the information read from the imaged information code matches a predetermined authentication string in the NFC information received in S 30 (i.e., performs authentication using the authentication string). When the CPU 42 determines that the information read from the imaged information code 110 matches a predetermined authentication string in the NFC information due to the fact that the information is a predetermined authentication information (YES in S 40), the process proceeds to S 50.

In S 50, the CPU 42 executes settlement processing using the destination information read from the imaged information code. Specifically, the CPU 42 transmits the user's name identifying the user of the mobile terminal 10, the remittance destination information, and the purchase price to the settlement server 600 via the network I/F 30. Accordingly, the settlement server 600 undertakes payment of the user's price by using the settlement information (for example, credit card numbers and point information) stored in the settlement server 600 associated with the user's name. The settlement server 600 transfers the paid amount to the destination indicated by the destination information. This allows the purchase price to be successfully settled.

In addition, in the settlement process, the CPU 42 receives the success notification indicating successful settlement from the settlement server 600 via the network I/F 30. The CPU 42 sends the user's name, the price, and the success notification to the management server 500 when the CPU 42 receives the success notification. As a result, result information indicating successful settlement of the charge by the user of the mobile terminal 10 is stored in the management table 510. If settlement fails in settlement processing, the CPU 42 sends a failure notification to the management server 500 in the same manner as the error processing in S 52, thus result information indicating that payment has failed for the user of the mobile terminal 10 is stored in the management table 510. When S 50 is over, the flowchart returns to the monitoring S10.

When the CPU 42 determines that the NFC information from the IC chip 124 via the NFC I/F 20 is not received (N0 in S 30), the CPU 42 proceeds to S 52. Such situations in which the NFC information from the IC chip 124 is not received are, for example, situations in which the distance between the NFC I/F 20 and the NFC tag 120 of the code display section 100 is far (for example, 10 cm or more), situations in which the NFC tag 120 is damaged for some reason, etc. In this case, error processing is performed and settlement processing is not performed.

In addition, when the CPU 42 determines that the information read from the imaged information code does not match a prescribed authentication string in the NFC information received in S 30 (N0 in S 40), the CPU proceeds to S 52. That is, the error processing is executed and settlement processing is not executed.

Effect of this Example

The conventional code display section does not have the NFC tag 120. For example, in a conventional code display section, if a malicious third party replaces the information code in the code display section with another information code, the price may not be paid to the store and the price may be illegally paid to the third party.

The code display section 100 of this example is equipped with the NFC tag 120. In this example, assume a situation in which the information code 110 in the code display section 100 is replaced by another information code. In this situation, the mobile terminal 10 determines that the information read out from the information code does not match a prescribed authentication string in the NFC tag 120 (N0 in S40) because the information code read out from the information code in S20 is a different information code from the information code 110, and therefore the mobile terminal 10 executes the error processing without executing settlement processing (S 52). Even if the information code 110 is replaced with another information code, unauthorized settlement of the purchase price can be prevented.

Also, for example, in a situation where the NFC tag 120 is damaged, the NFC information is not received from the IC chip 124 (N0 in S 30), and error processing is executed (S 52). For example, a situation is assumed in which the third party attempts to remove the code display section 100 from the base BD for information code switching. In this case, the installation part 103 may be damaged and the antenna coils 122 located in the installation part 103 may also be damaged. If the antenna coil 122 is damaged, the NFC information cannot be received from the antenna coil 122 and the settlement processing is not performed. Accordingly, the settlement processing can be prevented from being performed in cases where it is presumed that fraudulent activity has been committed.

It is assumed that the third party will grasp the display part 101 instead of the installation part 103 when removing the code display section 100 from the table BD. When the display part 101 is pulled against the installation part 103, a load is applied to the antenna coil 122 that straddles both the display part 101 and the installation part 103. With this load, breakage of the antenna coil 122 can be promoted.

(Correspondence)

The payment system 2, the code display section 100 and the mobile terminal 10 are examples of "payment system," "code display section" and "mobile terminal," respectively. The display surface 102, the information code 110, the IC chip 124 and the antenna coil 122 are examples of "display surface," "specific information code," "memory" and "antenna coil," respectively. The display part 101 and the installation part 103 are examples of "display part" and "installation part," respectively. The prescribed authentication information recorded in information code 110, the prescribed authentication characters stored in the IC chip 124 are examples of "first information" and "second information," respectively. The camera 12 and the NFC I/F 20 are examples of the "imaging unit" and the "transceiver," respectively. The control unit 40 is functionally an example of an "imaging control unit," a "transmission control unit," and a "processing control unit."

(Second Example) For example, a situation is assumed in which a conventional code display unit without the NFC tag and a code display section 100 with the NFC tag 120 are mixed. In the second example, a technique for appropriately executing settlement processing even in such a situation where two kinds of code display sections are mixed is disclosed.

The code display section 100 of the second example is similar to that of the first example, except that the information code 110 records the information indicating "NFC reading required" in addition to the remittance destination information and the prescribed authentication information. It should be noted that the information code in the conventional code display section does not record the information indicating "NFC reading required."

Figure 4:
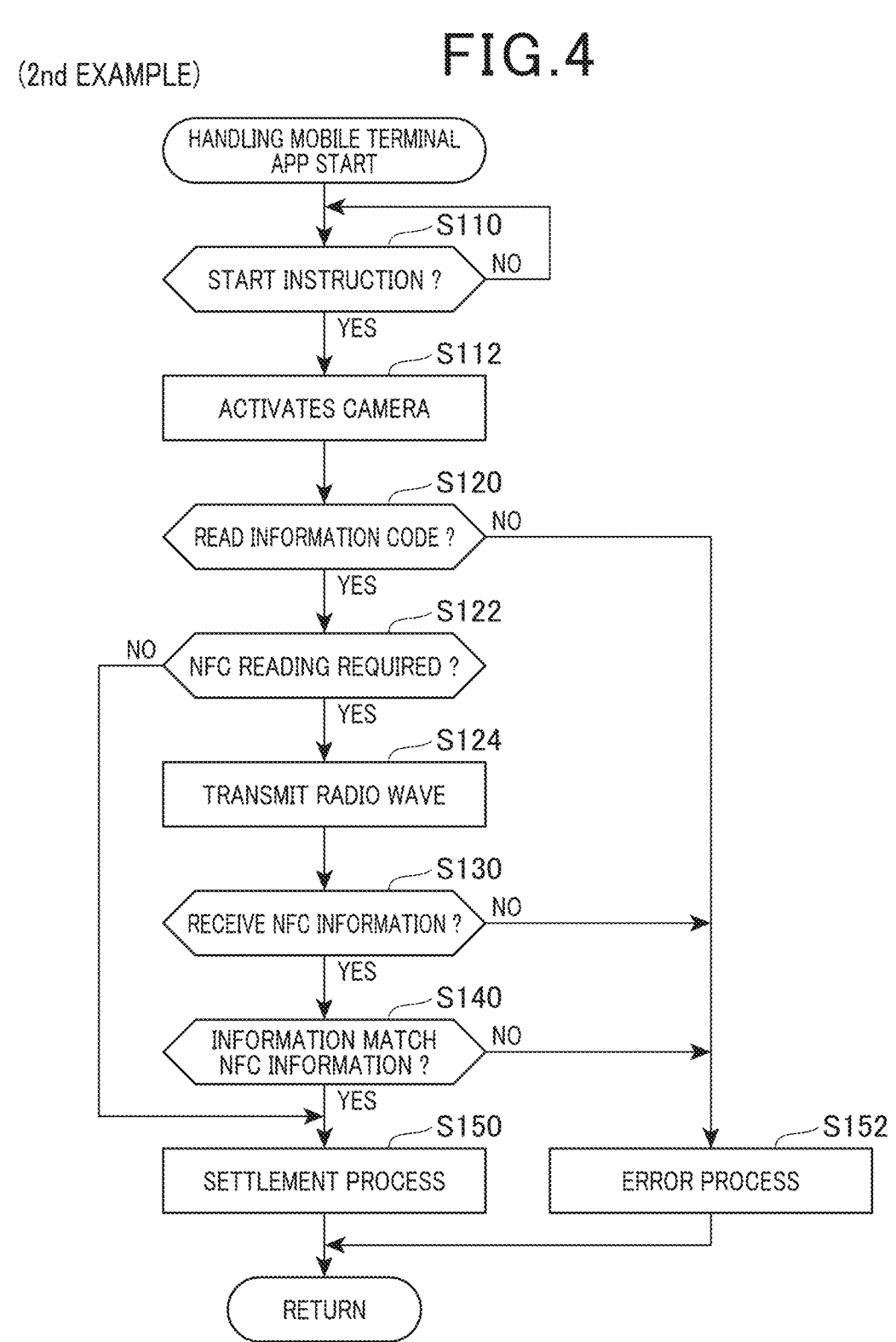
FIG. 4 shows a flowchart of the processing performed by the mobile terminal according to the second example.

(Handling Mobile Terminal 10; FIG. 4)

With reference to FIG. 4, the process executed by the CPU 42 of the mobile terminal 10 according to the app 52 in the second example is described hereinafter. The trigger of the processing in FIG. 4 is similar to the trigger of the processing in FIG. 3 in the first example. S 110, S 112, and S 120 are similar to S 10, S 12, and S 20 in FIG. 3. When the CPU 42 determines that the reading of the information code is successful (YES in S120), it proceeds to S 122, and when it determines that the reading of the information code is unsuccessful (N0 in S 120), it proceeds to S 152. S 152 is similar to S 52 in FIG. 3. At the end of S 152, the flowchart returns to monitoring S 110.

In S 122, the CPU 42 determines whether the information read from the imaged information code contains information indicating "NFC reading required." When the CPU 42 determines that the information read from the imaged information code contains information indicating "NFC reading required" (YES in S 122) due to the fact that the imaged information code is the information code 110 of the code display section 100, the CPU 42 proceeds to the processing after S 124. S 124, S 130, S 140, and S 150 are similar to S 14, S 30, S 40, and S 50 in FIG. 3. Namely, the CPU 42 executes the settlement process (S150) on the condition that the information from the already read information code matches a prescribed authentication string in the NFC information received in step S 30 (YES in step S140). When S150 is over, the flowchart returns to monitoring S110.

When the CPU 42 determines that the information read from the imaged information code does not include information indicating "NFC reading required" (NO in S 122) due to the fact that the imaged information code is the information code of the conventional code display section, the CPU 42 skips the processing of S 124 to S 130 and proceeds to S 152. Then, in S150, the CPU 42 executes settlement processing using the remittance destination information in the information code of the conventional code display section.

According to the configuration of this example, before the NFC I/F 20 transmits radio waves, the mobile terminal 10 images the information code (S 112) and determines whether the information code records information indicating "NFC reading required" (S 122). The fact that the information code does not record information indicating "NFC reading required" means that the information code is the information code of the conventional code display section. In this case (N0 in S 122), the mobile terminal 10 performs settlement processing using the information code in the conventional code display section (S150). In a situation where a conventional code display section and a code display section 100 equipped with the NFC tag 120 are mixed, the settlement processing using the conventional code display unit can be properly executed.

When it is determined that the information code does not record information indicating "NFC reading required" (N0 in S 122), the processing in S 124 is skipped and the NFC I/F 20 does not transmit radio waves. When the imaged information code is the information code of the conventional code display section, the unnecessarily transmission of the radio waves could be suppressed. The information indicating "NFC reading required" is an example of "prescribed instruction information."

Third Example

In recent years, there have been multiple payment services. In the third example, a technique for appropriately designating a specific payment service from multiple payment services is disclosed.

The code display section 100 in the third example is similar to the first example except that the IC chip 124 records the NFC information including the authentication character column and the payment destination information indicating a specific payment destination.

Figure 5:
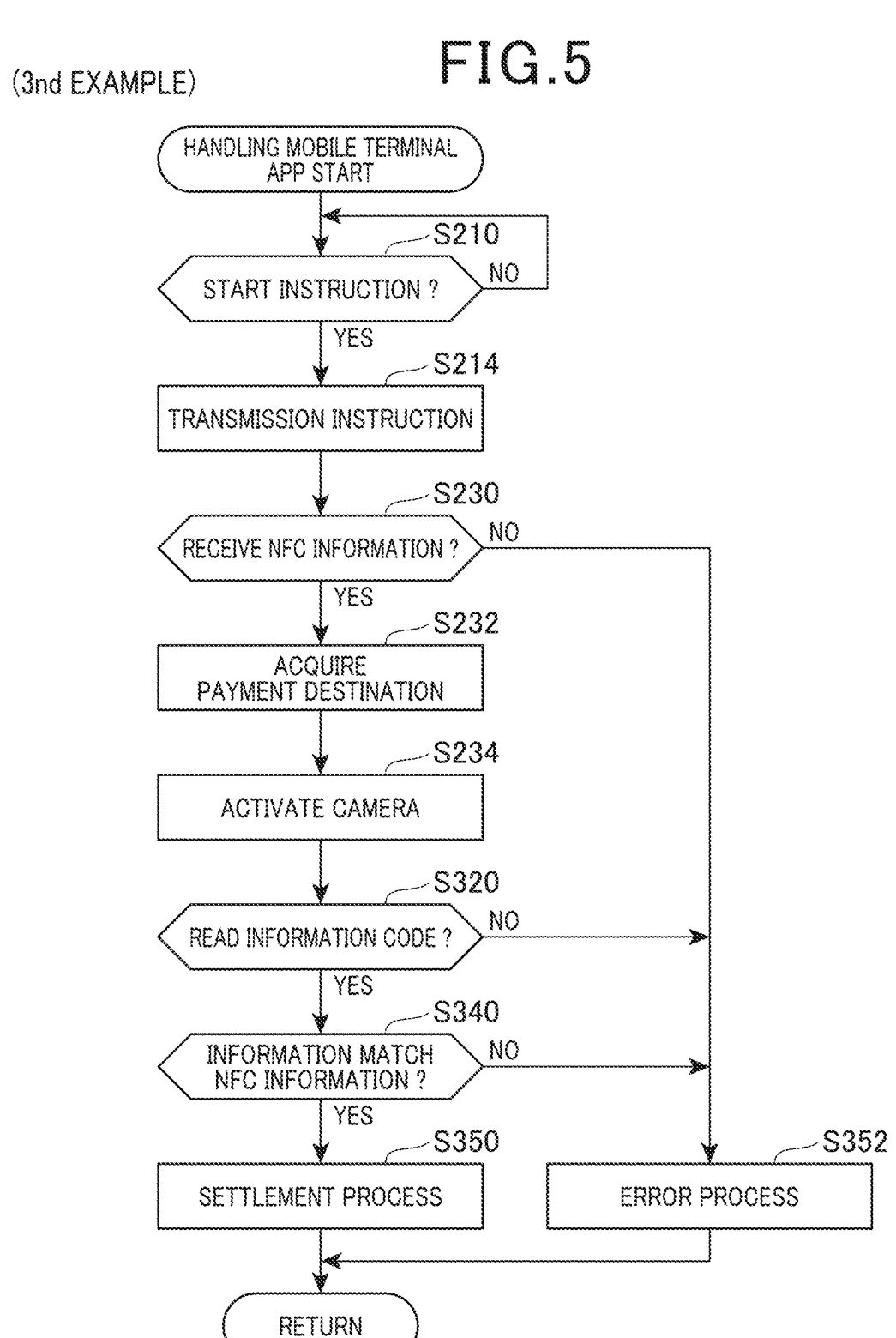
FIG. 5 shows a flowchart of the processing executed by the mobile terminal according to the third example.

(Mobile Terminal 10 Processing; FIG. 5)

The processing executed by the CPU 42 of the mobile terminal 10 according to the app 52 in the third example is described with reference to FIG. 5. The trigger of the processing in FIG. 5 is similar to the trigger of the processing in FIG. 3 in the first example.

S 210, S 214, and S230 are similar to S 10, S 14, and S30 in FIG. 3. If the CPU 42 determines that it has received the NFC information from the IC chip 124 via the NFC I/F 20 (YES in S230), it proceeds to S 232.

In S 232, the CPU 42 acquires the payment destination information from the received NFC information. In subsequent S 234, the CPU 42 activates the camera 12. S 320 is similar to S 20 in FIG. 3, except that the reading of the information code is performed using a program specific to the payee indicated by the payee information acquired in S 232. In the modified example, the processing of S234 may be executed before the processing of S 230. In this case, S 320 is similar to S 20 in FIG. 3, and S 320 does not require the use of the above specific program.

When the CPU 42 determines that the reading of the information code is successful (YES in S 320), it proceeds to S 340. S 340 is similar to S 40 in FIG. 3. S 350 is similar to S 50 in FIG. 3 except that the CPU 42 automatically specifies a specific settlement party (e.g., the URL of a settlement server 600) indicated by the settlement party information acquired in S 232 and executes settlement processing. S 352 is similar to S 52 in FIG. 3.

For example, a comparison example in which a user operates the operation section 16 to specify a specific settlement destination from multiple settlement destinations is assumed. In this comparative example, the user may find the operation of the operating section 16 annoying. On the other hand, according to the configuration of this example, the mobile terminal 10 can designate a specific settlement destination by using the settlement destination information in the IC chip 124. The user need not operate the operating section 16. The user's convenience is enhanced. The payment destination information in the IC chip 124 is an example of "payment destination information."

Fourth Example

In the fourth example, even if the NFC I/F 20 is unable to receive the NFC information in the NFC tag 120 due to the breakage of the NFC tag 120 or the like, settlement processing could be executed in response to an instruction from the user.

The management table 510 of the management server 500 of the fourth example stores the NFC reception information in addition to the user's name, the price and the result information in association with each piece of information. The NFC reception information indicates one of two values: "Yes" indicating that the NFC information in the NFC tag 120 has been received, and "No" indicating that the NFC information in the NFC tag 120 has not been received.

Figure 6:
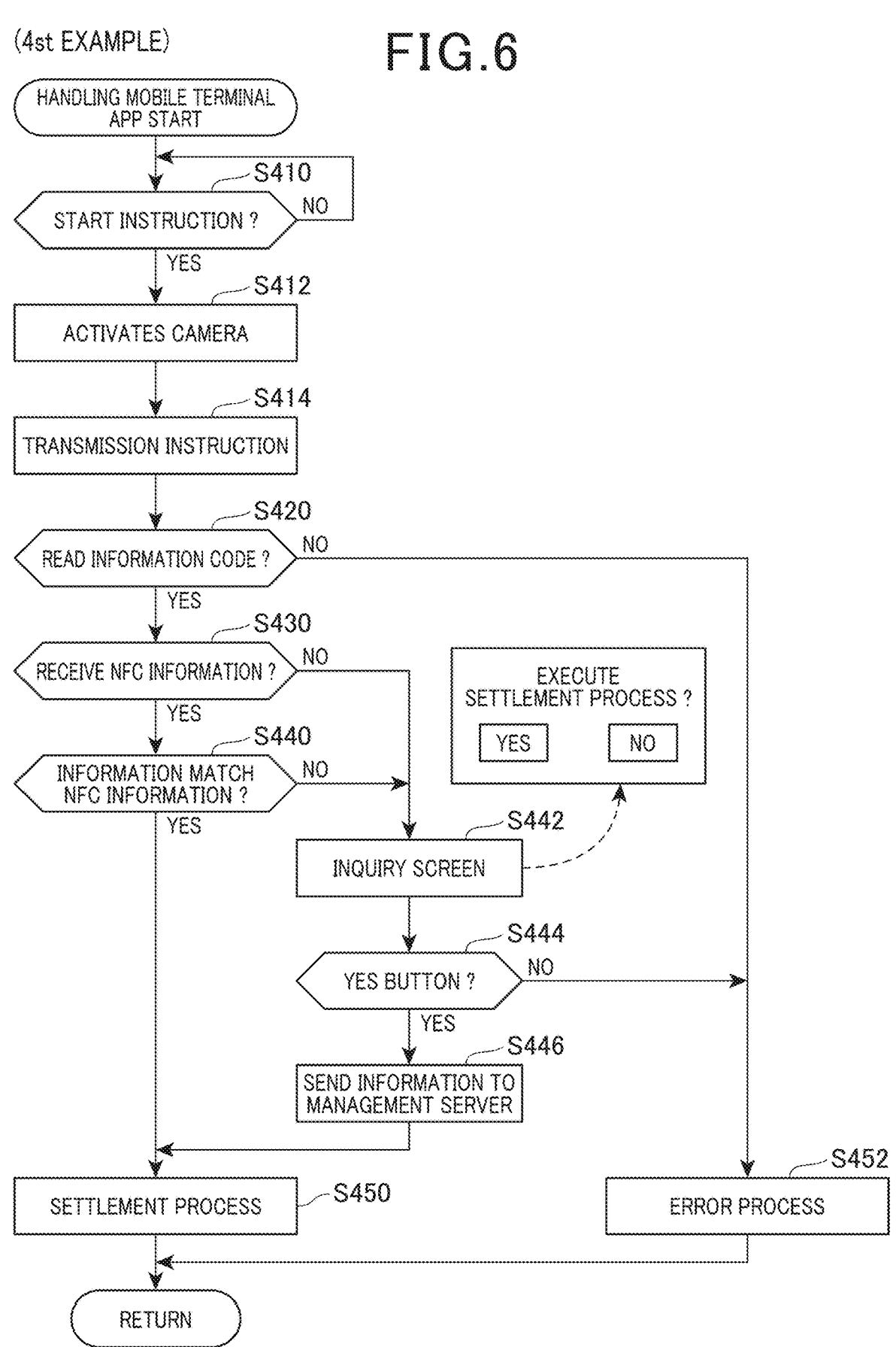
FIG. 6 shows a flowchart of the processing executed by the mobile terminal according to the fourth example.

(Handling Mobile Terminal 10; FIG. 6)

S 410 to S 440 are similar to S 10 to S 40 in FIG. 3. If the CPU 42 determines that the NFC information from the IC chip 124 is not received (NO at S 430), then the CPU 42 proceed to S 442.

In S 442, the CPU 42 displays the inquiry screen on the display 14. The inquiry screen is the screen for asking the user whether or not to execute settlement processing. The inquiry screen includes a YES button for receiving instructions to execute settlement processing and an NO button for receiving instructions not to execute settlement processing.

In subsequent S 444, the CPU 42 determines whether the YES button is selected in the inquiry screen. When the CPU 42 determines that the YES button is selected (YES in S 444), the process proceeds to S 446.

In S 446, the CPU 42 sends to the management server 500, via the network I/F 30, the information including the user's name identifying the mobile terminal 10 and information indicating that the YES button was selected in the query screen are Thus, in the settlement processing of S 450 executed after S 446, the management server 500 determines that the settlement executes without receiving the NFC information in the NFC tag 120 and the management server 500 stores the NFC reception information "nothing" in the management table 510. Thus, the administrator of the management server 500 can realize the fact that the settlement was executed without receiving the NFC information in the NFC tag 120.

When S 446 ends, the CPU 42 proceeds to S 450. S 450 is similar to S 50 in FIG. 3.

In addition, when the CPU 42 determines that the information read from the information code imaged in S 412 does not match a prescribed authentication string in the NFC information received in S 430 (N0 in S 440), the CPU 42 also proceeds to S 442. That is, when the YES button is selected in the query screen, the notification to the management server 500 is executed (S 446) as well as the settlement processing is executed. Thus, the administrator of the management server 500 can realize the fact that the settlement was executed in a situation where the information read out from the imaged information code does not match the prescribed authentication string in the NFC information. In the modified example, when the CPU 42 determines N0 in S440, it may skip the processing in S 442 and S 444 and execute the error processing in S452.

When the CPU 42 determines that the reading of the information code has failed (N0 in S420) or that the NO button has been selected in the inquiry screen (N0 in S 444), the CPU 42 skips the processing in S 450 and proceeds to S 452. S 452 is similar to S 52 in FIG. 3.

According to the configuration of this example, even if the NFC information is not received from the NFC tag 120 due to some cause (e.g., the NFC tag 120 is damaged), the settlement processing is executed when the YES button is selected on the inquiry screen (YES in S 444) (S 450). Even when the NFC information in the IC chip 124 is not available, the user can use the settlement using the remittance destination information in the information code 110 of the code display section 100. The user's convenience is enhanced.

(Correspondence)

The query screen of S 442, the selection of the YES button and the selection of the NO button in FIG. 6 are examples of the "inquiry screen," "first instruction," and "second instruction," respectively.

Fifth Example

Figure 7:
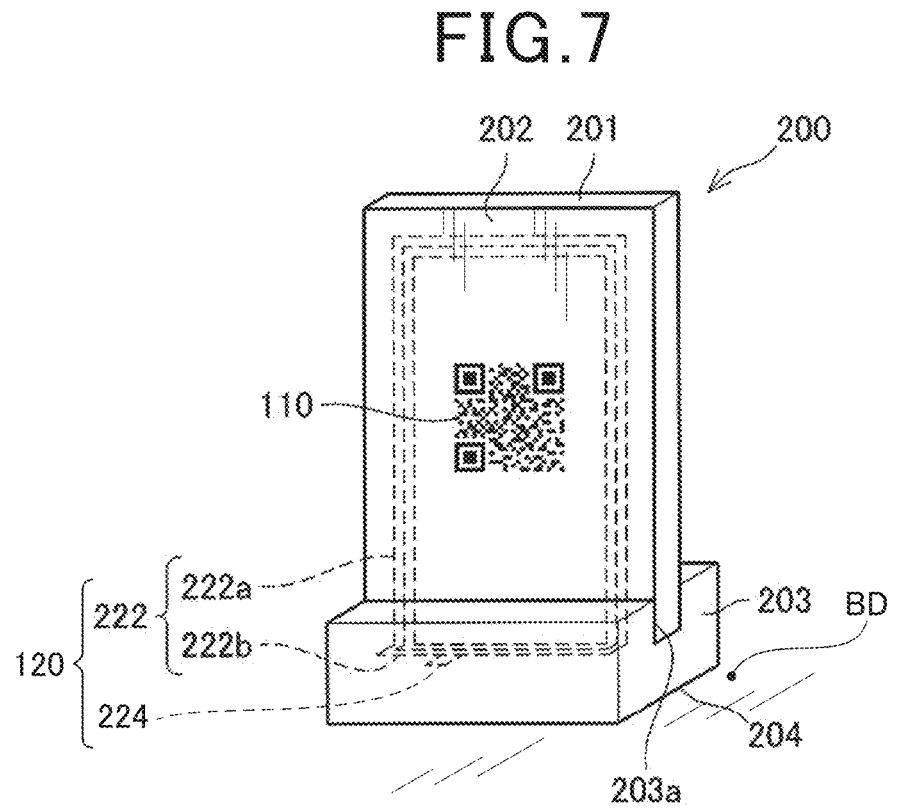
FIG. 7 shows a conceptual diagram of the code display section according to the fifth example.

The fifth example is similar to the fourth example except that the code display section 200 shown in FIG. 7 is used instead of the code display section 100. For this reason, a part of the flowchart shown in FIG. 6 is also referred to for explanation of this fifth example.

The code display section 200 includes the display surface 202 on which the information code 110 is displayed and the installation part 203 supporting the display part 201. The display parts 201 and the installation parts 203 are made of resin, for example. The lower surface 204 of the installation part 203 is, for example, bonded to the base BD of the store. The lower surface 204 of the installation part 203 functions as an installation surface.

A groove 203a is formed along one direction on the upper surface of the installation part 203. By inserting the lower part of the display part 201 into the groove 203a, the display part 201 is supported by the installation part 203. That is, the display parts 201 and the installation parts 203 are physically joinable and separable.

In the fifth example, the NFC tag 120 is composed of an antenna coil 222 and an IC chip 224. A part 222a of the antenna coil 222 is embedded inside the display part 201. On the other hand, a part 222b of the antenna coil 222 is also embedded inside the installation part 203. When the lower part of the display part 201 is inserted into the groove 203a, the part 222a of the antenna coil 222 and the part 222b of the antenna coil 222 are brought into contact and electrically connected to complete the antenna coil 222. In other words, when the display part 201 is separated from the installation part 203, the antenna coil 222 is cut off in the middle and is not completed, and the function of the antenna coil 222 is invalidated.

The IC chip 224 is embedded inside the installation part 203. In a variant, the IC chip 224 may be embedded inside the display part 201.

When the processing of FIG. 6 is executed, in the condition that the display part 201 separated from installation part 203, the mobile terminal 10 displays the inquiry screen due to the invalidity of the antenna coil 222 (S 442). The user can use the settlement using the remittance destination information in the information code 110 of the code display section 100 by selecting the YES button in the inquiry screen (YES in S 444, S 450). The user can separate the display part 201 from the installation part 203 and move the display part 201 arbitrarily from the base BD of the store. Accordingly, the user's convenience is enhanced.

(Correspondence)

The code display section 200 is an example of a "code display section." The display 202, the IC chip 224 and the antenna coil 222 (222a and 222b) are examples of "display surface," "memory" and "antenna coil," respectively. The display parts 201 and the installation parts 203 are examples of "display parts" and "installation parts" respectively.

Although specific examples of the techniques disclosed herein have been described, they are merely illustrative and do not limit the scope of the claims. The techniques described in the claims include various variations and modifications of the examples illustrated above. For example, the following variations may be employed:

(Variation 1) The "second information" is not limited to an authentication string that matches the authentication information in the information code 110, but may be, for example, an information that encrypts the authentication information, a key information for decrypting the authentication information, or an information for acquiring the authentication information from an external source (for example, a server on the internet 8). Generally speaking, the "second information" may be information to authenticate the "first information."

(Variation 2) In the first example, the code display section 200 of the fifth example may be used. In this case, the antenna coils 222 are not divided and may be embedded in the display parts 201. In this case, even if the display parts 201 are separated from the installation parts 203, the authentication of S40 is successful, so the settlement process can be executed.

(Variation 3) "Transceiver" is not limited to the NFC I/F 20, for example, RFID (radio frequency identifier) tag. may be an I/F for performing communication with the tag.

Sixth Example

A sixth example is described with reference to FIGS. 8 to 9 hereinafter. The components similar to those in the aforementioned examples are denoted by the same reference numeral, and their detailed descriptions are omitted or simplified.

The settlement system for buying and selling transactions 300 according to this sixth example has the mobile terminal 10 constructed in the same manner as the first example and the code display section 190. Furthermore, the settlement system 300 has a system configuration similar to that of the aforementioned FIG. 2 and is configured to allow online payment using the information code 110 and the communication system.

As an example, the mobile terminal 10 is constructed in the same manner as in the first example, and performs interactive processing with the user by the CPU 42 of the built-in control unit 40. Thus, the same settlement processing as described above can be ordered only when normal information communication can be achieved with the code display section 190 described later.

On the other hand, the code display section 190 is made of plastic or cardboard. The code display section 190 has a display part 101 folded in the side view and in the shape of "L", and an installation part 103 installed on the base DB. On the front of the display part 101, that is, on the display surface 102, a two-dimensional code 110 (such as a QR code (registered trademark)) is displayed by printing, pasting, etc., as described above.

Furthermore, the display part 101 and the installation part 103, which is bent but continuous with respect to the display part 101, are tensioned with an antenna coil 122 built in around them. An IC chip 124 is electrically connected to this antenna coil 122. The above configuration is similar to the first example described above.

The code display section 190 according to this example further has the following characteristic structure.

Figure 8:
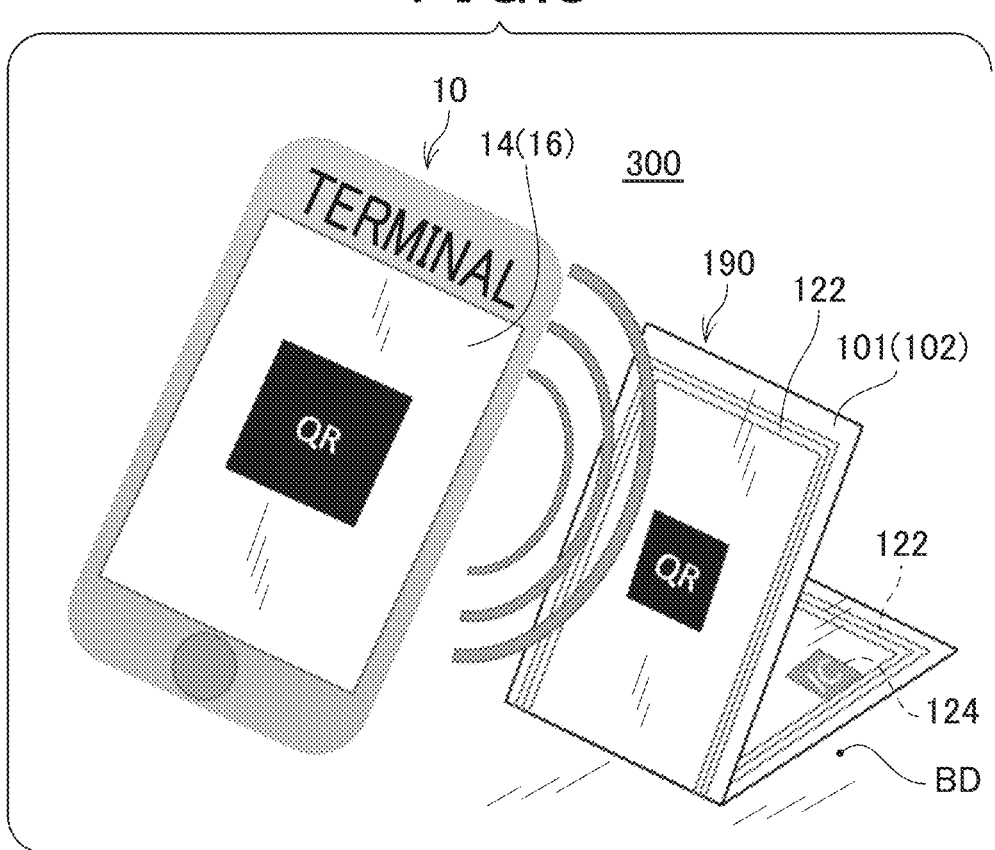
FIG. 8 shows an overview of the mobile terminal and the code display unit installed in the payment system according to the sixth example.

The installation part 103 of this code display section 190, as shown in FIG. 8, may be used, for example, installed on the stand BD of the store in such a manner that the display surface 102 of the display part 101 faces diagonally forward and is positioned so that NFC transmission and reception with the mobile terminal 10 can be performed. The back side of the installation part 103 is attached or locked to the upper surface of the base BD by means of attachment (locking) such as glue, double-sided tape, or spasms to a part or all of the same.

Figure 9:
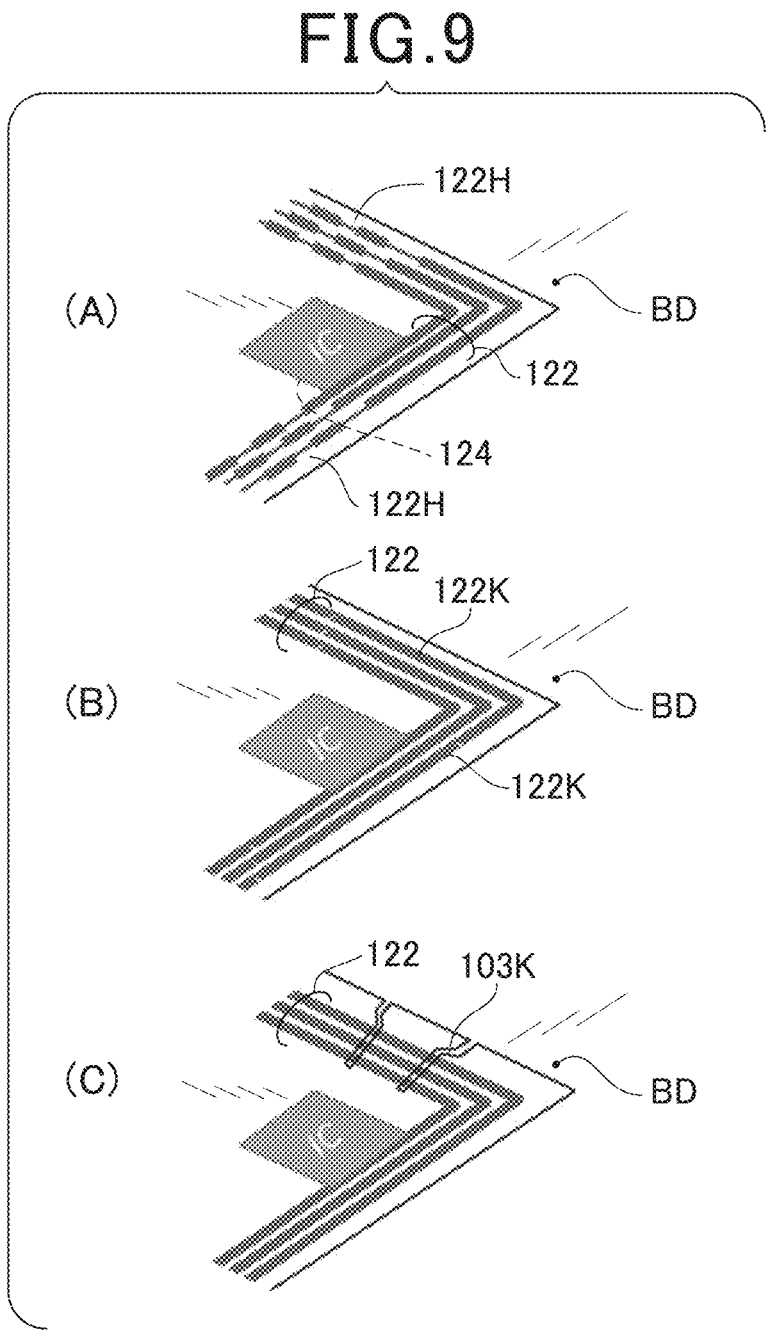
FIG. 9 is a diagram illustrating multiple types of promoting structures that promote the antenna installed in the code display section of the sixth example to actively cause loss of function during abnormal conditions.

In addition, at the required places (one or more places) at the end of this installation part 103, as shown in FIGS. 9 (A), 9(B) and 9(C), i) a plurality of narrower parts 122H the width of which is narrower than the remaining parts are formed (see FIG. 9 (A)), ii) a plurality of coil notches 122K (leaving the connection of the coil) are formed (see FIG. (B)), or iii) a plurality of mount notches 103 K are formed at the part of the installation part 103 through which the antenna coil 122 passes, at a part of the antenna coil 122. Of course, although not shown, the same installation part 103 may be provided with the aforementioned narrower parts 122H, coil notches 122K and mount notches 103K.

The narrow portions 122 H, coli notches 122 K and mount notches 103K described above are equivalent to means to facilitate the breakage or breakage of part of the installation part 103 or part of the antenna coil 122. The means may be formed singly or in combination. In combination, its active breaking or breaking function is enhanced.

With a configuration of and above, this settlement system 300 has a payment function similar to that of the first example described above.

In addition to this, when an external force exceeding the required force is applied to the code display section 190 by attempting to steal or replace the code display section 190 illegally, the installation part 103 peels off the table DB. At this time, an external force more than necessary is applied to the aforementioned narrow portion 122 H or coil notches 122 K, and in most cases, the antenna coil 122 is severed or destroyed, resulting in the loss of radio wave transmission and reception function. Also, when a mount notches 103 K is provided, an external force is applied to the antenna coil 122 from the mount notches 103 K and the coil 122 breaks or loses its function.

In this way, even if the code display section 190 encounters theft or unauthorized replacement (unauthorized duplication, etc.), it proceeds to active destruction of the antenna coil 122, so that it can exert a function to suppress such malicious acts against the code display section 190.

The effect of this example is different from the conventional anti-theft system using two-dimensional code and NFC described in, for example, JP-A-2019-28596. Unlike theft prevention with a combination of the two-dimensional code and NFC, fraud prevention and control can be achieved with the positive loss of function of NFC while the structure is simpler.

Seventh Example

A seventh example is described with reference to FIG. 10. The components similar to those in the first example described above are denoted by the same reference numeral, and their detailed descriptions are omitted or simplified.

The settlement system for buying and selling transactions 301 (see FIG. 10) according to this seventh embodiment is equipped with the mobile terminal 10 configured in the same manner as the first embodiment described above and the code display section 190. Furthermore, the settlement system 301 has a system configuration similar to that of the aforementioned FIG. 2, and is configured to allow online payment using the QR code 110 and the communication system.

This settlement is configured to be practicable with the NFC tag 120 in the code display section 100, which is responsible for the QR code (registered trademark) 110 and NFC (Near Field Communication) communication as information codes. The IC chip 124 of the NFC tag 120 stores in advance the NFC tag 120, that is, unique information (NFC information: second information) consisting of a number or the like that uniquely identifies the code display section 100. This unique information is, for example, a predetermined authentication string. In the QR code 110, destination information (store name, remittance account number, etc.) and corresponding NFC information are encoded and converted into data.

The processing executed by the CPU 42 of the mobile terminal 10 according to the app 52 will be described with reference to FIG. 10. This processing is similar to that in the first example, where the start of the app 52 is triggered to start execution (step S10).

When this processing is started, the camera 12 is activated first in S 12, and then radio transmission instructions are given in S 14. Then, the QR code 110 is read, the transmission from the code display section 100 is received, as the same in the process of FIG. 3. Then the decision whether or not the NFC information (unique information: first information) decoded from the QR code 110 matches the NFC information (unique information: second information) extracted from the received information from the code display section 100 is made (step S20', S 30' and S 40'). The step S40' functionally constitutes a determination means.

In this determination, if there is agreement, it can be judged that the code display section 100 is an authentic code display part that has not moved since its installation, that is, an information code that stores authentic settlement information without replacing the QR code 110, and that the settlement can be executed. On the other hand, if there is no match, it is the QR code with suspicious content and the settlement can be determined to be unacceptable. Of course, if the QR code cannot be read (decoding is not successful), it can also be determined that the settlement is not available.

Based on the result of such determination, the settlement processing (S50) with the settlement server 600 based on the remittance destination information, remittance source information, and amount information pertaining to the settlement, or error processing (S52) with the management server 500 accompanied by an indication of non-settlement (settlement prohibited) and a notification to the management company is performed, as the same as in the first example. The step S50 functionally constitutes a settlement acceptance means and the step D 52 functionally constitutes a settlement prohibition means.

As described above, the combination of QR code 110, which is rapidly spreading at present, and NFC, which can be easily configured, can provide the same operational effects as in the first example, such as theft prevention and the QR code replacement, by using the preset NFC specific information (NFC information). Since the QR code 110 is adopted as the information code in this example, the settlement system can be provided that effectively utilizes the various advantages that the QR code 110 potentially has.

Variation

In the above described examples, the remittance destination information is given to the QR code 110, but instead, it may be given to IC chip 124 of the display code section 100.

A SQRC (registered trademark), which is the QR code that can have public data and non-public data, may also be used as the QR code. In this case, the key information for the SQRC reading may be stored in the IC chip 124 of the display code section 100, and the key information may be used to decipher the SQRC. This further improves security.

In addition, the information on the need for reading (NFC reading) of IC chip 124 may be set in the QR code 110, and such NFC reading may be performed only when the information on the need for NFC reading is detected in the information read from the QR code 110. This eliminates useless communication.

Furthermore, the procedure of steps S442, S 444, and S 446 for instructing the continuation of the settlement at the customer's will in the event of a determination of non-settlement, as described in the flowchart of FIG. 6, may be embedded in the processing shown in the flowchart of FIG. 10 described above. This will further improve the customer's convenience. The steps S442, S 444 and S 446 functionally constitute another means of determination.

Furthermore, in the processing of FIG. 10, the sequence of the step S12 of camera activation and the step S14 of radio wave transmission instruction may be interchanged.

Furthermore, in the same as in the sixth example, in the event of an illegal act such as an attempt to steal the code display section 100, the installation part 103 may be attached or locked so that all or part of the main elements such as the antenna 122 and the IC chip 124 remain separated, even if the display part 101 and the installation part 103 fall off the base BD, depending on the external force. It is effective in curbing illegal activities such as theft.

Furthermore, in this settlement system, in the case if settlement acts are completed within the mobile terminal 10, the management server 500 (administrator) may not be notified.

Eighth Example

The eighth example is described with reference to FIGS. 11 and 12.

This eighth example has a contracture which is applicable to the code display section of the various settlement systems described so far. The details relate to the shape of the loop antenna to be installed in the code display section, and other than that, the structure is the same as those of the examples described so far.

Figure 11:
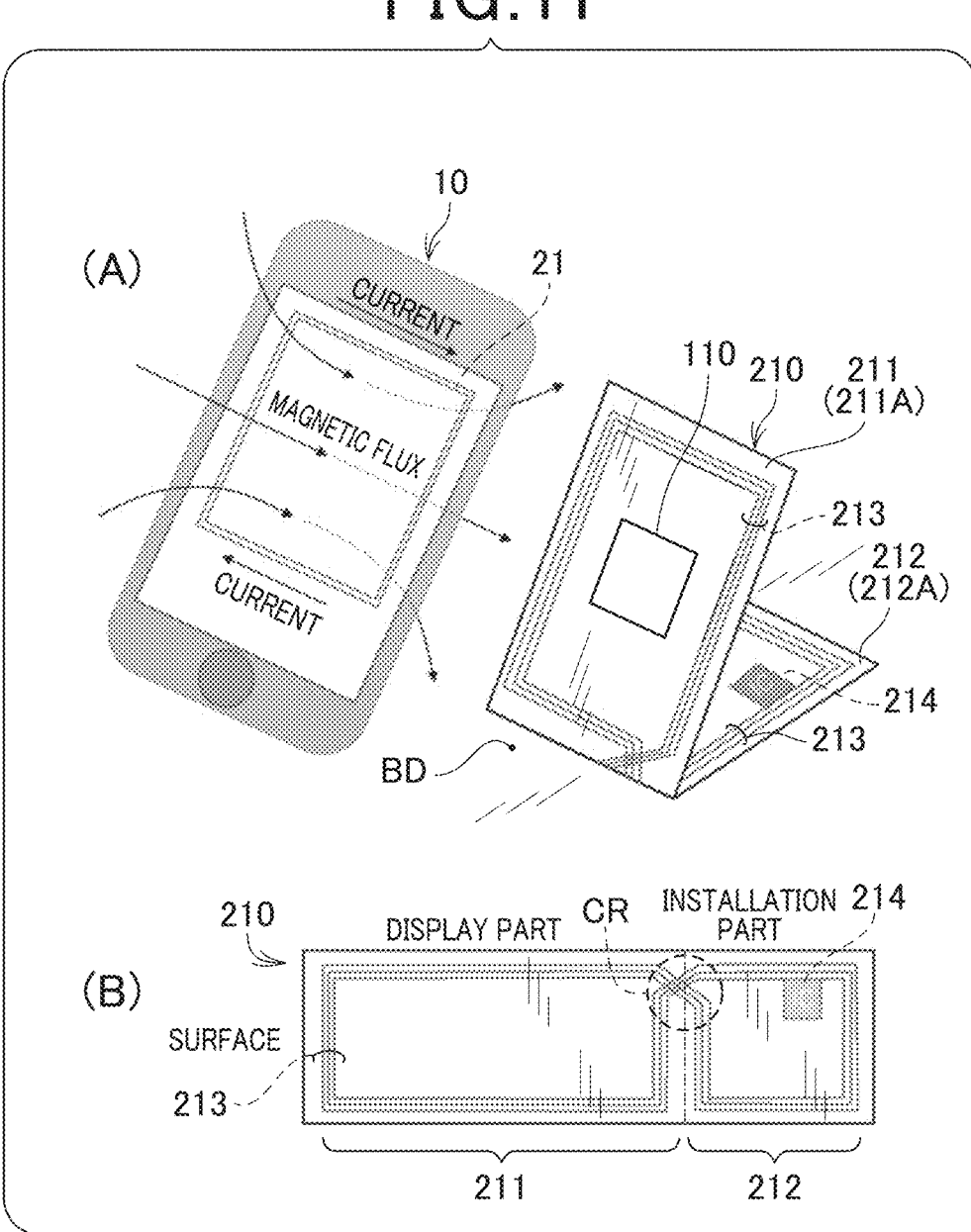
FIG. 11 is a diagram for explaining the outline of the mobile terminal and the code display section to be installed in the payment system according to Example 8, and the intersecting arrangement of antennas provided in the code display section.

The code display section 210 according to the eighth example is shown in FIGS. 11 (A) and (B). The code display section 210 has the plate-like display parts 211 and installation parts 212 presenting the display surface 211A and the mounting surface 212B, respectively. The display surface 211A and the mounting surface 212B are connected and bent in the middle. This point is the same as the code display section described in the previous examples.

The differences are that a looped communication antenna coil 213 is placed inside both the display part 211 and the installation part 212 so as to circle around the ends of both parts' multiple times, and that the antenna coil 213 is spaced out from each other in the vicinity of the above fold (reference sign CR in FIG. 11).

Figure 12:
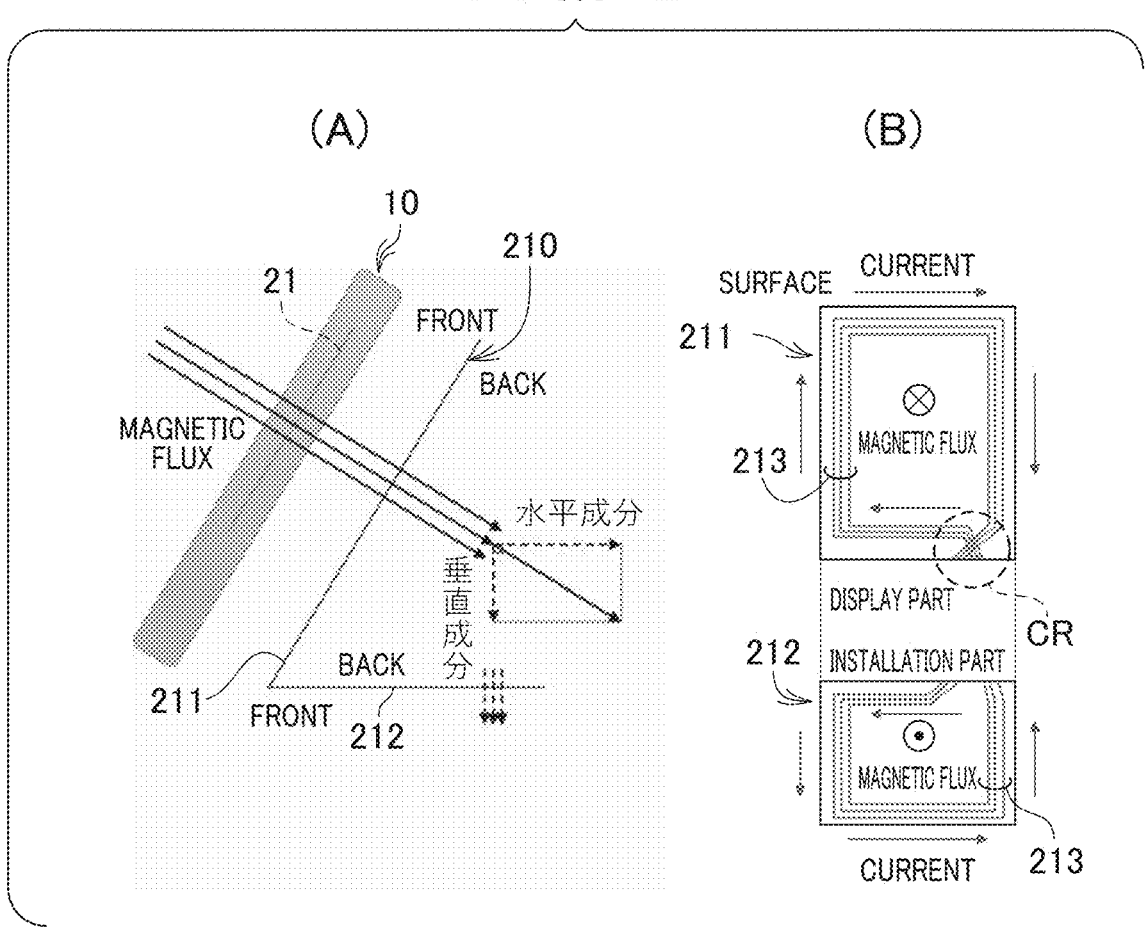
FIG. 12 is a diagram illustrating the function of antenna cross placement in Example 8.

Therefore, the magnetic flux component of the electromagnetic wave emitted from the transmitting and receiving loop antenna 21 connected to the NFC I/F 20 of the mobile terminal 10 penetrates the antenna coil 213 of the display part 211 (see FIG. 12 (A)). Considering the display of the display part 211 and the installation part 212, the magnetic flux component penetrates from the front surface to the back surface on the side of the display part 211, and the magnetic flux component penetrates from the back surface to the front surface on the side of the installation part 212 (see FIG. 12 (B)). Since the antenna coil 213 is intersected on the side of the display part 221 and the side of the installation part 212, the current induced in this coil 213 has a circular path formed on each side of both parts 211,212, and a current path corresponding to electromagnetic induction is secured on each side (that is, it flows in the same direction in the path). This ensures a reasonable NFC read distance.

In contrast, when they do not cross, the directions of the induced currents on each side of both parts 211,212 are opposite to each other when viewed across the path and, therefore, the NFC reading distance drops. However, according to the present embodiment, such inconvenience does not occur.

Ninth Example

Figure 13:
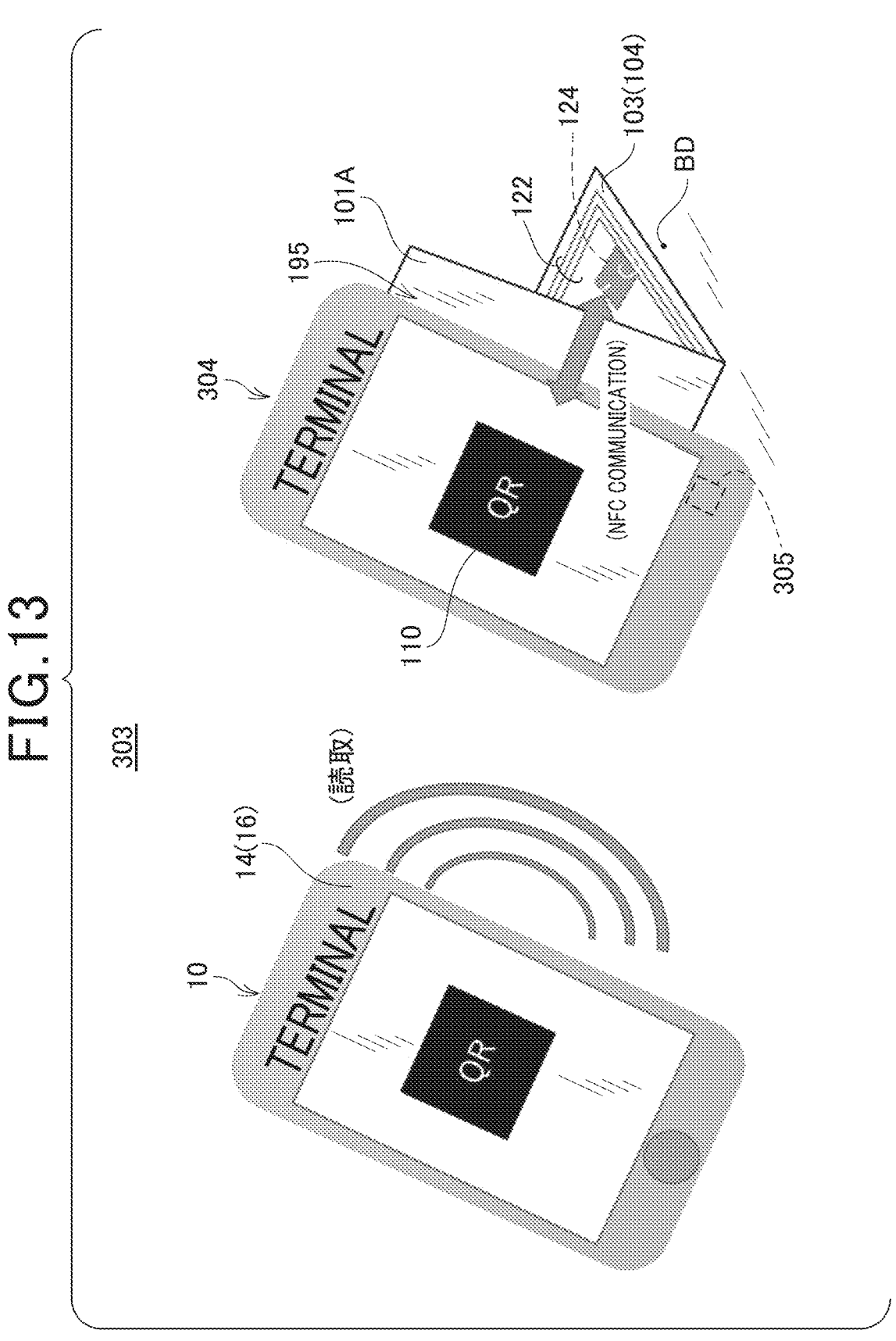
FIG. 13 shows a conceptual diagram of the settlement system according to Example 9.

A ninth example will be described further with reference to FIG. 13.

The settlement system 303 according to this ninth example is equipped with a mobile terminal (reading terminal) 10 (see FIG. 8) configured in the same manner as described above, a display terminal 304 provided as a separate element, and a terminal stand 195 configured in the same manner as described above.

The terminal stand 195 is structurally equivalent to the display part 101 of the configuration of the code display section 100 described in the aforementioned FIG. 8. The terminal stand 195 does not have the QR code arranged on the surface of the front part 101A. The terminal stand 195 is constructed so that the display terminal 304 can be propped up or supported and so that the display terminal 304 is contacted or separated by a prescribed distance.

For this reason, when in use, the display terminal 304 facing the mobile terminal 10 is detachably locked or held so as to be propped against the terminal stand 195, or placed at a predetermined distance apart. This display terminal 304 can display the QR code (registered trademark) 110 on its display surface only while it is authenticated by the IC chip 124 of terminal stand 195 and NFC communication by processing of the IC 305 for the communication device.

For this purpose, the communication IC 305 stores in advance, in its memory area (not shown), specific information (e.g., store identification ID) that uniquely designates the location of the display terminal 304. Then, the IC 305 of the display terminal 304 receives the specific information uniquely stored by the IC chip 124 of the terminal stand 195 by NFC communication, and determines that the authentication has been achieved only when the specific information matches between those. Only when this authentication is obtained, the IC 305 of the display terminal 304 displays the QR code for payment. In other words, although not shown in the figure, the IC 305 of the display terminal 304 is configured to perform the processing steps for such reception, judgment and display, and functionally constitutes determination and display means. This processing step is similar to the processing of part of the flow in FIG. 3 described above, with replacement of steps S30 (receive), S 40 (judge), and S 50 (display of QR code for payment to perform settlement processing).

To provide versatility, the memory area of the communication device IC 35 may store specific information that specifies each of the multiple locations permitted in advance. In this case, it is only necessary to determine which one piece of specific information read from the IC chip 124 of the terminal stand 195 through NFC communication falls under among the multiple pieces of such specific information. Thus, for example, the same display terminal 304 can be used to handle multiple terminal stands 195 (with different specific information) placed in the same store. This allows, for example, the destination information to be included in the QR code to be displayed to be changed, and for example, it is easy to change the destination according to the type of product sold.

The installation parts 103 of the terminal stand 195 are placed on the table BD as described above. The installation parts 103 is attached in part or on the entire surface of the table DB. Therefore, when the installation part 103 is moved from the installation site, the antenna 122 is damaged and the NFC function is lost, which helps to prevent theft. The antenna 122 is intersected between the installation part 103 and the front part 101A, for example, as in the aforementioned eighth example.

According to this example, the QR code as an information code is displayed only while the display terminal 304 is propped against the terminal stand 195. Therefore, when the display terminal 304 is moved, for example, by the shop staff, the information code read by the mobile terminal 10 no longer exists. Accordingly, acts such as theft and switching of the information code could be prevented or prevented.

The technical elements described herein or in the drawings may be singly or in various combinations, and is not limited to the combination of the claims as filed. In addition, the technology exemplified in this specification or in the drawings accomplishes multiple purposes simultaneously, and accomplishing one of those purposes has its own technical utility.

DESCRIPTION OF REFERENCE NUMERAL

2: Settlement system
8: Internet
10: Mobile terminal (reading terminal)
12: Camera
14: Display
16: Operation section
20: NFCI/F
30: Network I/F
40: Control section
42: CPU
44: Memory
50: OS programs
52: Application program (app)
100: Code display area
101: Display Part
102: Display
103: Installation parts
104: Installation surface
110: Information Code
120: NFC tag
122: Antenna coil
124: IC chip
200: Code display area
201: Display Part
202: Display
203: Installation parts
203a: Grooves
204: Bottom
222 (222a and 22b) Antenna coil
224: JC chip
500: management server
management table
510 Settlement server
300,301,303: Settlement system

What we claim:
1. A settlement system for buying and selling transactions, comprising:
a code display section; and
a mobile terminal, wherein:
a first information and a remittance destination information indicating a destination of money to be purchased in a purchase transaction are displayed as a specific information code on a display surface of the code display section, the code display section has
a memory for storing a second information for authenticating a first information, and
an antenna coil capable of receiving radio waves from the outside, generating electromotive force, supplying the electromotive force to the memory, and transmitting the second information recorded in the memory,
the mobile terminal has
an imaging unit capable of imaging the information code,
a transceiver capable of transmitting the radio waves and receiving a response to the radio waves,
an imaging control unit that causes the imaging unit to image the information code,
a transmitter control unit for transmitting the radio waves to the transceiver, and
a processing control unit that performs settlement processing using the remittance destination information read from the specific information code when authentication using the first information read from the specific information code and the second information received by the transceiver as the response to the radio wave is successful,
the processing control unit receives the second information as the response to the radio wave from the antenna coil, but prohibits the settlement process when the authentication fails due to the imaging unit images an information code different from the specific information code,
the code display section is composed of a display part equipped with the display surface and an installation part for mounting the display part on a stand,
the antenna coil is applied to both the display part and the installation part, and
in the code display section, a loop-shaped antenna for the transmission and reception is placed from the installation part to the display part around and over both parts, and the looped antenna is spatially intersected during a circuit so that a direction of an induced current flowing to the antenna at the part of the installation part is a same as a direction of the induced current flowing to the antenna at the part of the display part.
2. The settlement system according to claim 1, wherein the specific information code records a prescribed instruction information, the imaging control unit causes the imaging unit to image the information code before the transceiver transmits the radio wave,
the transmission control unit causes the transceiver to transmit the radio wave when the instruction information is read from the imaged information code, and
the processing control unit executes the settlement processing without causing the transceiver to transmit the radio waves when the instruction information is not read from the information code imaged by the imaging unit.
3. The settlement system according to claim 1, wherein the memory further memorizes a settlement information to which a specific payment is settled,
the transceiver receives the settlement information from the antenna coil, and
the processing control unit executes the settlement processing by designating the specific payment indicated by the settlement information.

4. The settlement system according to claim 1, wherein the mobile terminal is further provided with:

a display and a display control processor that causes an inquiry screen to be displayed on the display when the transceiver does not receive the second information from the antenna coil in spite of transmitting the radio wave; wherein the processing control unit executes the settlement processing when the first instruction is given in the query screen, but does not execute the settlement processing when the second instruction different from the first instruction is given in the query screen.

5. The settlement system according to claim 1, wherein the processing control unit does not execute the settlement processing when the second information is not received from the antenna coil though the transceiver transmitted the radio waves.

6. The settlement system according to claim 1, wherein the display parts and the installation parts are physically joined and separated from each other, wherein the processing control unit may execute the settlement process when the transceiver transmits the radio waves though the second information is not received from the antenna coil.

7. The settlement system according to claim 1, wherein the memory is located in the installation part.

8. The settlement system according to claim 1, wherein the display parts and the installation parts are physically joined and separated from each other, wherein the antenna coil is applied to a part of the display part and a part of the installation part in such a way that it goes through the part of the display part and the part of the installation part, wherein a loop of the antenna coil is completed when the display parts and the installation parts are physically joined, but the loop of the antenna coil is positioned so as to be disconnected when the display part is separated from the installation part, and wherein the processing control unit is configured so as not to execute the settlement process when the transceiver does not receive the second information from the antenna coil despite transmitting the radio waves.

9. The settlement system according to claim 1, wherein a means is provided to facilitate breaking of a part of the installation part or a part of the antenna coil when the installation part is moved by applying an external force equal to or greater than a force of locking the installation part.

10. The settlement system according to claim 1, wherein the information code is a QR code (registered trademark), the first information is an unique information specific to the QR code read and deciphered from the QR code by the imaging unit, the second information is unique information for authenticating the first information extracted from a received information from the code display section, and wherein the processing control unit has a determining means for determining whether or not the unique information read from the QR code and the unique information received from a code display unit match and a settlement admissibility means that allows settlement according to the settlement information recorded in the QR code when the of unique information read from the QR code and received from the code display unit are matched by the determining means.

11. The settlement system as claimed in claim 10, wherein a reading of the QR code by the imaging unit is performed to precede a transmission and reception with the code display section, and wherein the processing control unit further includes another determining means for judging a necessity of the transmission and reception with the code display section based on the result of reading the QR code.

12. The settlement system as claimed in claim 10, wherein a reading of the QR code by the imaging unit is performed to precede a transmission and reception with the code display section, and wherein the processing control unit automatically selects a method for the buying and selling transaction stored in advance in the code display section.

13. The settlement system as claimed in claim 10, wherein the code display section has a part of the installation part installed in a locked state on the stand, wherein an antenna for a transmission and reception is located at least in the part of the installation part, and wherein the antenna loses its function when the locking state of the installation part is forcibly lost.

14. The settlement system according to claim 10, wherein the code display section has a part of the installation part installed in a locked state on the stand and a part of the display part that displays or presents the QR code in an integral series and bent from the installation part.

15. A settlement system for buying and selling transactions, comprising:

a mobile terminal;

a display terminal; and a terminal stand, wherein:

a display surface of the display terminal is configured to be capable of displaying a QR code (registered trademark) for recording at least a destination information indicating a destination of remittance of a purchase price to be purchased in relevant buying and selling transaction and a location of installation, the terminal stand has a configuration that at least memorizes the location of installation and enables NFC communication, the display terminal is provided with a means for determining whether or not the installation locations of the QR code coincide with the installation locations of the terminal stand via the NFC communication and a means for displaying the QR code on the display surface when the installation locations coincide, the mobile terminal is configured to obtain a settlement information associated with the buying and selling transaction by imaging the QR code displayed on the display surface of the display terminal, the code display section is composed of a display part equipped with the display surface and an installation part for mounting the display part on a stand, the antenna coil is applied to both the display part and the installation part, and in the code display section, a loop-shaped antenna for the transmission and reception is placed from the installation part to the display part around and over both parts, and the looped antenna is spatially intersected during a circuit so that a direction of an induced current flowing to the antenna at the part of the installation part is a same as a direction of the induced current flowing to the antenna at the part of the display part.

* * * * *